No. 720,321. PATENTED FEB. 10, 1903.
F. BUCHANAN.
SECONDARY BATTERY.
APPLICATION FILED MAR. 18, 1901.
NO MODEL.
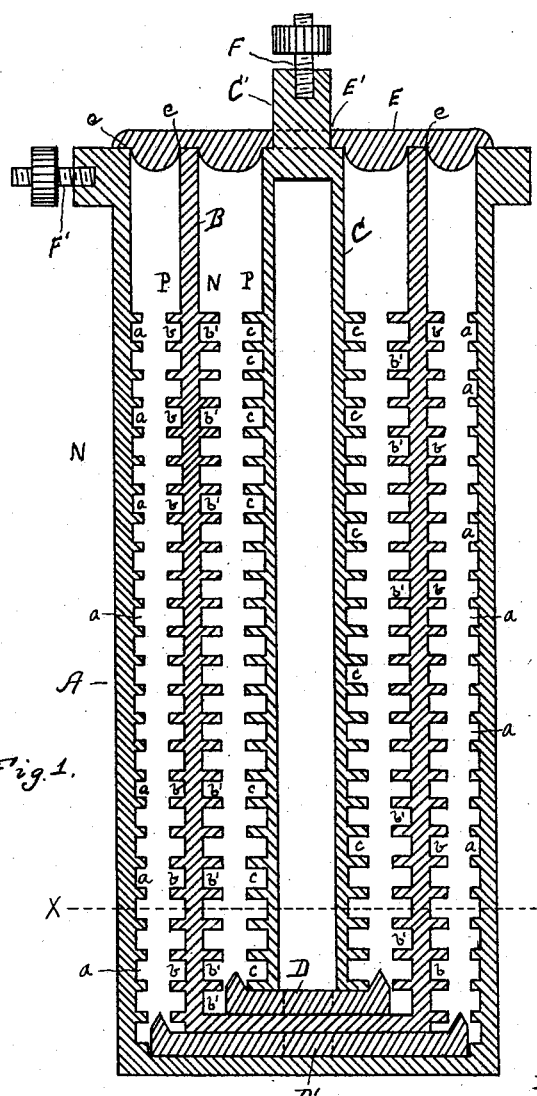
Fig. 1.
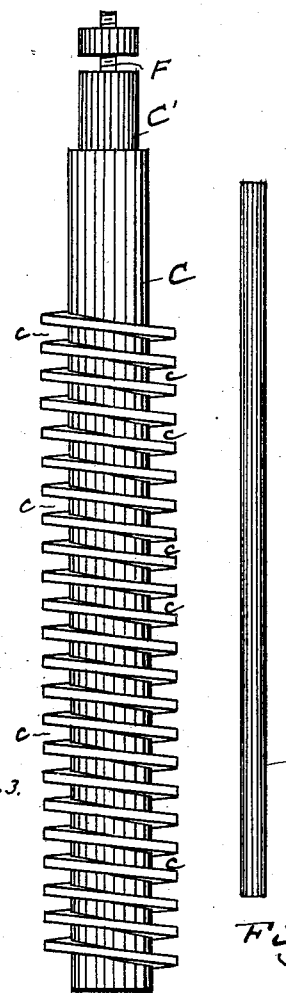
Fig. 3.
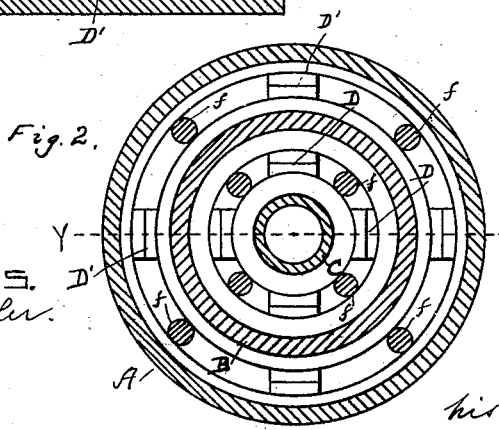
Fig. 2.
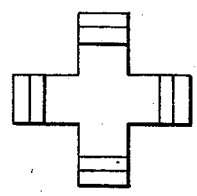
Fig. 4.
Fig. 5.
WITNESSES.
Matthew Siebler.
C. Theobald.
F. Buchanan.
INVENTOR.
By R. J. McCarty,
his ATTORNEY.

UNITED STATES PATENT OFFICE.

FRANK BUCHANAN, OF DAYTON, OHIO.

SECONDARY BATTERY.

SPECIFICATION forming part of Letters Patent No. 720,321, dated February 10, 1903

Application filed March 18, 1901. Serial No. 51,763. (No model.)

*To all whom it may concern:*

Be it known that I, FRANK BUCHANAN, a citizen of the United States, residing at Dayton, in the county of Montgomery and State of Ohio, have invented certain new and useful Improvements in Secondary Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in secondary batteries.

The object of the invention is to provide an accumulator of the above type which is of a compact form and which may have an electromotive force of two or more volts without materially increasing the size of the battery.

A further object of my invention is to provide an accumulator or battery of the above type in which the electrodes have a maximum degree of strength, owing to the same being of cylindrical form.

In a detail description of the invention reference is made to the accompanying drawings, of which—

Figure 1 is a longitudinal sectional elevation of my accumulator on the line $y\ y$ of Fig. 2. Fig. 2 is a cross-section on the line $x\ x$ of Fig. 1. Fig. 3 is an elevation of one of the electrodes. Fig. 4 is a plan view of one of the spiders by means of which the lower ends of the electrodes are maintained in proper positions. Fig. 5 is an elevation of an insulating-rod for the same purpose.

In the present instance the battery or accumulator is of four volts. This may be varied according to the voltage required. The outer containing-cell A constitutes the negative electrode of the battery, the adjacent cell B constitutes both positive and negative electrodes, and the inner electrode C constitutes a positive-pole electrode. It will be understood that the intervening cell or electrode divides or separates the solution or electrolyte from the inner and outer electrodes. These electrodes are formed or cast from lead unmixed with alloy and are essentially of cylindrical form. By thus making the cells of cylindrical form a pure quality of lead may be used without endangering the strength of such cells; also, by using the cylindrical form of cells the battery is comprised within the narrowest limits. This is clearly shown in the drawings, where a battery of four volts is illustrated. The outer containing-cell A has a series of circular or spirally-arranged ribs throughout its inner surface, the next inner adjacent cell B has two series of such ribs, one on the outer surface thereof and one on the inner surface thereof, while the extreme inner electrode has an outer series of such ribs. These ribs so arranged provide on each electrode or element a series of circular or spirally-arranged recesses $a$, $b$, $b'$, and $c$, which are adapted to contain the active material or where the active material may be formed.

D and D' designate spiders constructed of any suitable insulating material, such as vulcanized fiber or hard rubber, and placed on the bottom of the cells A and B, by means of which the said cells at the lower end are insulated and maintained in proper positions.

E is a circular cover constructed of any suitable insulating material—such, for example, as vulcanized fiber—and inclosing the top of the battery. This cover has a series of concentric grooves $e$, which receive the upper ends of the cells and maintain such upper ends in suitable positions, said cover thus coöperating with the lower spacing devices D and D'.

In Figs. 2 and 5 I show other means by which the cells or elements of the battery may be maintained in suitable positions within the outer containing-cell. This means consists of a plurality of insulating-rods $f$, which are placed in upright positions at suitable points between the cells, as shown in Fig. 2. Such rods are constructed of suitable insulating material. It will be understood that when these devices are used the spiders D and D' are unnecessary. The central electrode C has an extension C', which projects through a central opening E' in the cover, and thus serves as means for maintaining the cover in position. F is a binding-screw on said extension C', to which the wire forming the positive conductor is secured.

F' is a binding-screw attached to the outer cell and providing a connection for the wire carrying the negative current.

It is obvious that the pockets or spaces for the active material may be arranged longitudinally on the inner sides of the electrodes; but this is not the preferred form.

Having described my invention, I claim—

1. A secondary battery, the electrodes of which consist of three or more concentric tubular lead electrodes, the said electrodes being separate and disconnected, so that each containing-electrode separates the solution from the next adjacent outer electrode, the outermost one of such tubular electrodes, forming the main containing-cell and constituting an electrode of single polarity, and insulating means between said electrodes.

2. A secondary battery, the electrodes of which consist of three or more concentric tubular lead electrodes, the outermost one of said electrodes being of single polarity and constituting the main containing-cell, the innermost electrode being of single polarity, one or more intervening bipolar electrodes separating the solution from the next adjacent outer electrode, and means for insulating said electrodes.

3. A secondary battery, the same consisting of three concentric tubular lead electrodes, the walls of which contain the active material, insulating means between said electrodes, the outer containing-electrode supporting the active material on the inner side thereof, the next adjacent electrode supporting the active material on both sides and dividing the solution or electrolyte from the outer and inner electrode, the innermost electrode having means for containing the active material on its outer side, and means for insulating and maintaining said electrodes in suitable relative positions.

4. The combination of three concentric lead tubes, the outermost tube constituting the containing-cell, and being provided with suitable spaces on its inner side containing active material, the innermost cell being provided with similar spaces on its outer side containing the active material, said innermost and outermost concentric tubes constituting each, an electrode of single polarity, a concentric tube intervening between the outer and inner tubes being provided with spaces containing the active material and separating the solution or electrolyte from the outer and inner electrodes, the said intervening tube constituting bipolar electrodes, and means for insulating and maintaining the tubes in suitable relative positions.

5. In a storage battery, a central electrode element, a conducting-case from which said element is insulated and in which it is contained, having interior electrochemically-active surfaces constituting one element of a battery-couple, and exterior electrochemically-active surfaces comprising an element of another battery-couple, and an outer coacting electrode element for completing the second battery-couple, substantially as set forth.

6. In a storage battery, a central electrode element, a conducting-case from which said element is insulated and in which it is contained, having interior electrochemically-active surfaces constituting one element of a battery-couple, and exterior active surfaces comprising an element of another battery-couple, and a conducting-case in which said first-mentioned case is contained, its inner surfaces, electrochemically active, comprising an element of the second battery-couple, substantially as set forth.

7. In a storage battery, a central electrode element, a liquid-tight conducting-case having its interior and exterior surfaces electrochemically active, and surrounding said central element, and another liquid-tight conducting-case having its interior surfaces electrochemically active and surrounding said first-mentioned case, substantially as set forth.

8. In a storage battery, a central electrode element, and a series of liquid-tight conducting-cases, one within the other, and insulated one from the other, their respective interior and exterior surfaces electrochemically active, and an exterior conducting containing-case active on its inside surface, substantially as set forth.

In testimony whereof I affix my signature in presence of two witnesses.

FRANK BUCHANAN.

Witnesses:
  GEO. F. GROVE,
  G. E. BROWN.